US008341612B2

(12) United States Patent
He et al.

(10) Patent No.: US 8,341,612 B2
(45) Date of Patent: Dec. 25, 2012

(54) METHOD AND APPARATUS FOR RUN-TIME STATISTICS DEPENDENT PROGRAM EXECUTION USING SOURCE-CODING

(75) Inventors: Dake He, Yorktown Heights, NY (US); Ashish Jagmohan, Irvington, NY (US); Jian Lou, Cambridge, MA (US); Ligang Lu, New City, NY (US)

(73) Assignee: International Business Machines Corporation, Armonk, NY (US)

( * ) Notice: Subject to any disclaimer, the term of this patent is extended or adjusted under 35 U.S.C. 154(b) by 1392 days.

(21) Appl. No.: 11/749,295

(22) Filed: May 16, 2007

(65) Prior Publication Data

US 2008/0288929 A1 Nov. 20, 2008

(51) Int. Cl.
*G06F 9/455* (2006.01)
*G06F 17/50* (2006.01)
*G06F 9/45* (2006.01)

(52) U.S. Cl. ........ 717/153; 717/140; 717/151; 717/152; 717/155; 717/158; 716/113

(58) Field of Classification Search .................. None
See application file for complete search history.

(56) References Cited

U.S. PATENT DOCUMENTS

| | | | | |
|---|---|---|---|---|
| 5,202,975 | A * | 4/1993 | Rasbold et al. | 717/151 |
| 5,655,122 | A * | 8/1997 | Wu | 717/152 |
| 5,742,803 | A * | 4/1998 | Igarashi et al. | 712/233 |
| 5,765,037 | A * | 6/1998 | Morrison et al. | 713/502 |
| 6,151,706 | A * | 11/2000 | Lo et al. | 717/155 |
| 6,374,367 | B1 * | 4/2002 | Dean et al. | 714/37 |
| 6,516,462 | B1 * | 2/2003 | Okunev et al. | 717/154 |
| 6,542,644 | B1 * | 4/2003 | Satoh | 382/246 |
| 6,584,611 | B2 * | 6/2003 | Babaian et al. | 717/155 |
| 6,588,009 | B1 * | 7/2003 | Guffens et al. | 717/161 |
| 6,745,384 | B1 * | 6/2004 | Biggerstaff | 717/140 |
| 6,817,013 | B2 * | 11/2004 | Tabata et al. | 717/151 |

(Continued)

OTHER PUBLICATIONS

Zhu et al., A Path Decomposition Approach for Computing Blocking Probabilities in Wavelength-Routing Networks [online], 2006, IEEE/ACM Transactions on Networking, vol. 8 No. 6 [Retreived on Sep. 20, 2011]. Retrieved from the internet: <URL: http://delivery.acm.org/10.1145/360000/358917/00893871.pdf?ip=151.207.242>. pp. 747-762.*

(Continued)

*Primary Examiner* — Don Wong
*Assistant Examiner* — Anibal Rivera
(74) *Attorney, Agent, or Firm* — Scully, Scott, Murphy & Presser, P.C.; Daniel P. Morris, Esq.

(57) ABSTRACT

Disclosed are a method and system for optimized, dynamic data-dependent program execution. The disclosed system comprises a statistics computer which computes statistics of the incoming data at the current time instant, where the said statistics include the probability distribution of the incoming data, the probability distribution over program modules induced by the incoming data, the probability distribution induced over program outputs by the incoming data, and the time-complexity of each program module for the incoming data, wherein the said statistics are computed on as a function of current and past data, and previously computed statistics; a plurality of alternative execution path orders designed prior to run-time by the use of an appropriate source code; a source code selector which selects one of the execution path orders as a function of the statistics computed by the statistics computer; a complexity measurement which measures the time-complexity of the currently selected execution path-order.

20 Claims, 7 Drawing Sheets

U.S. PATENT DOCUMENTS

| | | | | |
|---|---|---|---|---|
| 7,007,272 | B2* | 2/2006 | Clarke | 717/153 |
| 7,080,365 | B2* | 7/2006 | Broughton et al. | 717/146 |
| 7,137,110 | B1* | 11/2006 | Reese et al. | 717/158 |
| 7,293,260 | B1* | 11/2007 | Dmitriev | 717/151 |
| 7,509,244 | B1* | 3/2009 | Shakeri et al. | 717/140 |
| 7,543,283 | B2* | 6/2009 | Luk et al. | 717/153 |
| 7,657,877 | B2* | 2/2010 | Vorbach et al. | 717/140 |
| 7,797,691 | B2* | 9/2010 | Cockx et al. | 717/155 |
| 7,926,043 | B2* | 4/2011 | Vaswani et al. | 717/153 |
| 7,966,610 | B2* | 6/2011 | Lin | 717/153 |
| 8,032,875 | B2* | 10/2011 | Kosche et al. | 717/153 |
| 8,166,462 | B2* | 4/2012 | Kosche et al. | 717/153 |
| 8,200,469 | B2* | 6/2012 | Honda | 716/113 |
| 2002/0095666 | A1* | 7/2002 | Tabata et al. | 717/149 |
| 2006/0242636 | A1* | 10/2006 | Chilimbi et al. | 717/158 |

OTHER PUBLICATIONS

Zhan et al., Statistical Critical Path Analysis Considering Correlations [online], 2005, IEEE, [Retreived on Sep. 20, 2011]. Retrieved from the internet: <URL: http://ieeexplore.ieee.org/stamp/stamp.jsp?tp=&arnumber=1560156>. pp. 698-703.*

Styles et al., Exploiting ProgramBranch Probabilities in Hardware Compilation [online], Nov. 2004, IEEE Transactions on Computers, vol. 53, No. 11 [Retreived on Sep. 20, 2011]. Retrieved from the internet: <URL: http://www.doc.ic.ac.uk/~wl/papers/tc04hes.pdf>. pp. 1408-1419.*

Fauster et al., Intelligent Editor for Writing Worst-Case-Execution-Time-Oriented-Programs [online], 2003, Springer-Verlag Berlin Heidelberg [Retreived on Sep. 20, 2011]. Retrieved from the internet: <URL: http://www.springerlink.com/content/5nlenvkakyy3wxpr/fulltext.pdf>. pp. 190-205.*

Jin Lin et al., A Compiler Framework for Speculative Analysis and Optimizations, ACM 1-58113-662-5, 2003, [Retreived on Jun. 25, 2012]. Retrieved from the internet: <URL: http://dl.acm.org/citation.cfm?id=781164> 11 Pages (289-299).*

Ali-Reza Adl-Tabatabai et al., Compiler and Runtime Support for Efficient Software Transactional Memory, ACM 1-59593-320-4, 2006, [Retreived on Jun. 25, 2012]. Retrieved from the internet: <URL: http://dl.acm.org/citation.cfm?id=1133985> 12 Pages (26-37).*

Akash Lal et al., Path Optimization in Programs and Its Application to Debugging, 2006, [Retreived on Jun. 25, 2012]. Retrieved from the internet: <URL: http://www.springerlink.com/content/18461w67h1629880/fulltext.pdf> 18 Pages (246-263).*

M. Haneda, P.M.W. Knijnenburg and H.A.G. Wijshoff, On the Impact of Data Input Sets on Statistical Compiler Tuning, Proc. Workshop on Performance Optimization of High-Level Languages and Libraries (POHLL), 2006.

R.P.J. Pinkers, P.M.W. Knijnenburg, M. Haneda, and H.A.G. Wijshoff, Statistical Selection of Compiler Options, IEEE Mascots 2004; and.

J. Gonzalez and A. Gonzalez, The potential of data value speculation to boost ILP, Proc. 12th ACM International Conference on Supercomputing, 1998.

* cited by examiner

METHOD AND APPARATUS FOR RUN-TIME STATISTICS DEPENDENT PROGRAM EXECUTION USING SOURCE-CODING

BACKGROUND OF THE INVENTION

1. Technical Field

The present invention relates generally to methods and apparatuses for speeding up program execution time by making use of data-dependent optimization of program execution. More specifically, the present invention relates to designing program execution paths for several potential data statistics on the basis of source-coding principles, and dynamically optimizing program execution time, during run-time, on the basis of the designed execution paths and the statistics of the incoming data stream to be processed.

2. Background Art

Data-dependent optimization of program execution refers to re-ordering of program modules (each of which may be one or more instructions) on the basis of the data to be processed. Data-dependent optimization can be used to considerably improve the average computational complexity of programs, especially in the case where different possible data inputs vary significantly in terms of the program modules, which are needed for processing, and in terms of the complexity of each such program module. A prime example of a domain in which this is the case is multimedia processing. In media compression or filtering, for instance, there may be a significant difference in the number of times each program module is invoked to process an independently coded data block, as compared to the case of a predictively coded data block. Also, the complexity of each program module may be significantly different in the two cases.

FIG. 1 depicts an exemplary program, which contains multiple branch instructions invoked at various levels. The input data signal 100 is input to the first branch instruction $B_1$ 101. The result of the branch instruction is binary, and it is used to select between one of two alternate subsequent program execution paths. If the outcome of branch instruction 101 is a 0, program execution continues with the execution of processing module 102, which requires $c_0$ cycles to execute. The result of the processing module 102 is program output $o_0$ 103. If the outcome of branch instruction 101 is a 1, program execution continues with the execution of processing module 110, which requires $c_1$ cycles to execute. The result of the processing module 110 is input to a second branch instruction $B_2$ 111. If the outcome of branch instruction 111 is a 0, program execution continues with the execution of processing module 112, requiring $c_2$ cycles, whose result is program output $o_1$ 113. Alternately, if the outcome of branch instruction 111 is a 1, processing module 120 (requiring $c_3$ cycles) is executed, and the result is input to branch instruction B3 121. Branch instruction 121 selects between processing module 124 (with output $o_3$ 125) and processing module 122 (with output $o_2$ 122).

The execution path order of the program can be described as a tree, where each vertex of the tree represents a branch instruction. Thus the vertices of the tree in FIG. 1 are the branch instructions 101, 111 and 121. Each edge of the tree represents a program module, comprised of code instructions, which are executed when the edge lies on the execution path of the program. For each edge $e_i$ of the tree, denote $c_i$ as the computational complexity of the set of instructions represented by that edge. In FIG. 1 the edges of the tree represent the program modules 102, 112, 122 and 124. The total complexity associated with each possible outcome $o_i$ is the sum of the complexities of the edges lying on the path from the root of the tree to that output. Represent the probability of occurrence of each output as $P_i$, and represent the total complexity associated with each output as $C_i$. Thus, in FIG. 1, the total complexity associated with output $o_2$ is $C_2=c_1+c_3+c_4$, and the probability of occurrence of output $o_2$ is $P_2$. To minimize the expected complexity of execution of the program (or equivalently to maximize its expected execution speed), it is necessary that $\Sigma P_i C_i$ be minimized.

FIGS. 2(a) and 2(b) show the working of two conventional methods for data-dependent program optimization. The first method, illustrated in FIG. 2(a) employs static optimization during compilation, wherein sample data sets, termed training data sets, are used to tune compiler output. Specifically, during compilation, statistics collected from sample data sets are used to determine a fixed program execution path, which indicates the order in which the branch instructions and program modules are to be executed. During execution the input data signal 200 is processed using the determined static execution path 201, resulting in the output signal 202. Various embodiments of this method are described by M. Haneda, P. M. W. Knijnenburg and H. A. G. Wijshoff, *On the Impact of Data Input Sets on Statistical Compiler Tuning*, Proc. Workshop on Performance Optimization of High-Level Languages and Libraries (POHLL), 2006, and by R. P. J. Pinkers, P. M. W. Knijnenburg, M. Haneda, and H. A. G. Wijshoff, Statistical Selection of Compiler Options, IEEE MASCOTS 2004. The main limitation of this method is the underlying assumption that the statistics of the training data used to determine the execution path during compilation would be statistically typical of the input data observed during execution. This assumption may be incorrect at times. Further the use of a fixed program execution order makes this approach non-adaptive, and unsuitable for the case where the data-statistics vary with time. A further shortcoming of these approaches is that the compiler tuning is often ad-hoc, and is not guaranteed to minimize the expected complexity of execution of the program even in the case that the training data is statistically typical.

The second conventional method, shown in FIG. 2(b), employs data-value dependent execution to speed-up program execution time. More specifically, in this method, multiple alternative program execution orders are employed each of which is efficient for a specific input data value or for a specific set of input data values. For example, in FIG. 2(a), execution path 212 is efficient when the input data signal 210 has the value 0, execution path 214 is efficient when signal 210 has the value 1, and execution path 213 is efficient when signal 210 has a value which is neither 0 nor 1. During execution, the input data signal 210 is input to the selector 211, which selects the appropriate execution path based on the value of the data signal. The output signal 216 is derived from the selected execution path. An embodiment of this method is described by J. Gonzalez and A. Gonzalez, *The potential of data value speculation to boost ILP*, Proc. 12th ACM International Conference on Supercomputing, 1998. The main shortcoming of this method is that it is limited, in practice, to providing optimized performance when the incoming data takes values in a small subset of the most frequently occurring data values. For example, for media compression programs, an optimized execution path may only be provided for the case where the input signal is 0, and a non-optimized execution path may process all other signal values. A further shortcoming of this method is that it is also non-adaptive; if the most frequently occurring data-values change over time, the employed program execution orders become computationally inefficient.

Therefore, a need exists for an improved method for speeding up program execution time by making use of data-dependent optimization of program execution, which can adapt during run-time to the changing statistics of the incoming data, and which minimizes the program execution time for a large class of signals.

SUMMARY OF THE INVENTION

An object of this invention is to improve methods and systems for speeding up program execution time.

Another object of the present invention is to provide a method and system for dynamic, data-dependent optimized program execution.

A further object of the invention is to provide a method and system for speeding up program execution time, which can adapt during run-time to the changing statistics of the incoming data, and which minimizes the program execution time for a large class of signals.

These and other objectives are attained with a method of and system for run-time statistics dependent program execution to process a given input data signal. The method comprises the steps of, prior to run-time, designing a plurality of program execution path orders; at run time, determining a defined set of statistics of said input data signal; and using said defined set of statistics to select one of said plurality of program execution path orders to process said given input data signal. The input data signal is then processed according to said selected program execution path order.

Regarding the phrase 'run-time': Run-time refers to the phase when the program binary (program machine-code) is being executed on a processor. This is as opposed to 'compile-time', which is the phase when the program binary is being generated, typically by the use of a compiler. In the context of the preferred embodiment of the present invention: (1) The multiple execution paths are designed prior to compile-time. (2) The program binary generated by the compiler (during compile-time) incorporates all of these multiple execution paths. (3) During run-time, when the program is being executed on a processor, the appropriate execution path is selected for a given data input based on the data statistics. The program will typically process multiple data inputs over the course of execution (i.e. during run-time), and hence, typically, multiple execution paths will be selected over the course of run-time.

In the preferred embodiment of the invention, each of the execution path orders includes a plurality of paths and the defined set of statistics include for each path of each execution path order, a respective one probability value $P_i$ representing the probability that said each path will be taken, and a respective one complexity value $C_i$ representing the complexity of the said each path. Also, in this preferred embodiment, optimal execution path order is the execution path order having the minimal $\Sigma P_i C_i$ over all of the paths of the execution path order.

The preferred system of the present invention provides a statistics computer which computes statistics of the incoming data at the current time instant, where the said statistics include the probability distribution of the incoming data, the probability distribution over program modules induced by the incoming data, the probability distribution induced over program outputs by the incoming data, and the time-complexity of each program module for the incoming data, wherein the said statistics are computed on as a function of current and past data, and previously computed statistics; a plurality of alternative execution path orders designed prior to run-time by the use of an appropriate source code; a source code selector which computes the optimal execution path as a function of the statistics computed by the statistics computer; a complexity measurement which measures the time-complexity of the currently selected execution path-order.

The preferred embodiment of the present invention utilizes a plurality of alternative execution paths each of which is optimized for a data set with specific statistics. These alternative data-paths are designed using source-coding principles. During program execution, the local time-averaged statistic is computed and used to select the optimum data-path for execution. The present invention allows for optimized program execution over a large range of input data patterns, instead of a few specific data values. Also, the approach of this invention is dynamic in that it yields optimized performance even when data statistics change with time.

BRIEF DESCRIPTION OF THE DRAWINGS

Preferred embodiments of the present invention will be described below in more detail, with reference to the accompanying drawings.

DETAILED DESCRIPTION OF THE PREFERRED EMBODIMENTS

Embodiments of the present invention disclosed herein are intended to be illustrative only, since numerous modifications and variations of these embodiments will be apparent to those of ordinary skill in the art. In reference to the drawings, like numbers will indicate like parts continuously throughout the views.

Figure 1:
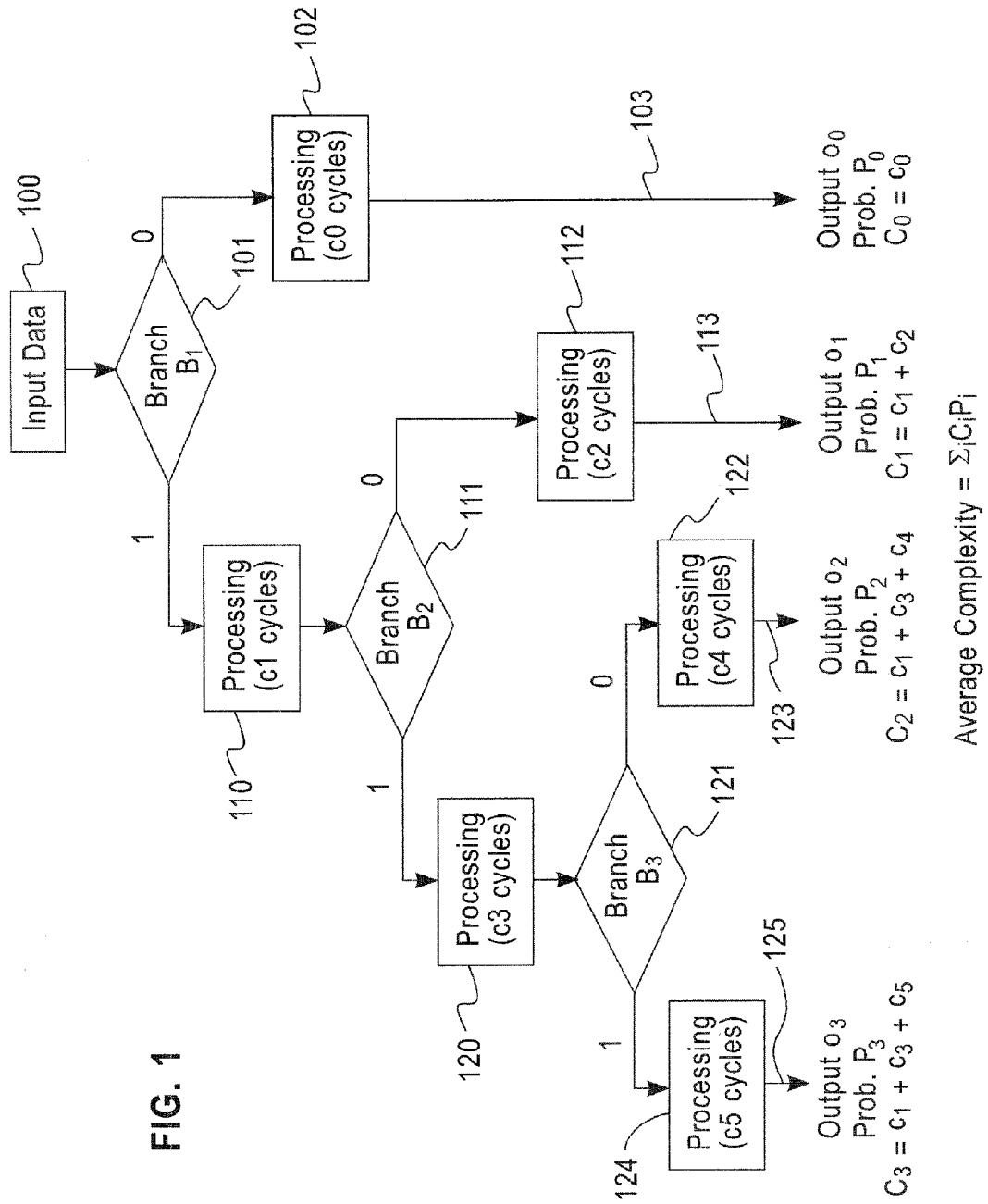
FIG. 1 is a diagram illustrating an exemplary program execution path order, wherein each edge denotes a program module consisting of one or more instructions.
Figure 2:
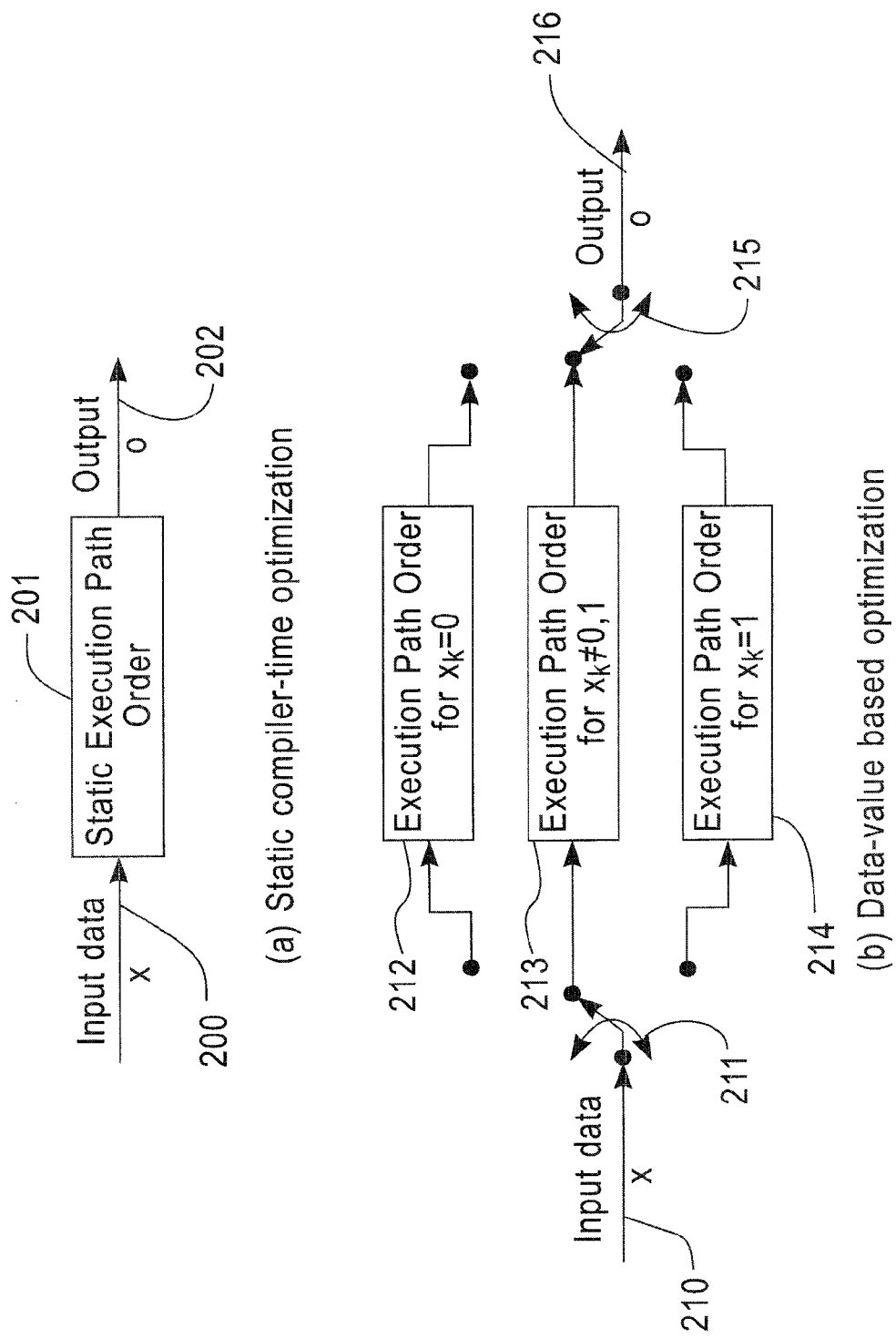
FIGS. 2(a) and 2(b) illustrate two prior art data-dependent optimized program execution methods.

Referring to FIG. 1, the statistics represented by the probabilities $P_i$ and the complexities $C_i$ are a function of the input data signal. For input data, which induces statistics {Pi, Ci}, the program complexity is minimized by finding the ordering of the tree which minimizes $\Sigma P_i C_i$. Using information-theoretic source-coding principles can derive this order. For example, a minimum-length Huffman code-tree obtained for the coding problem where message-words have probabilities $P_i$, and the length function is obtained by weighing the codeword for the i-th message word by $C_i$, yields the tree which minimizes the sum $\Sigma P_i C_i$.

Figure 3:
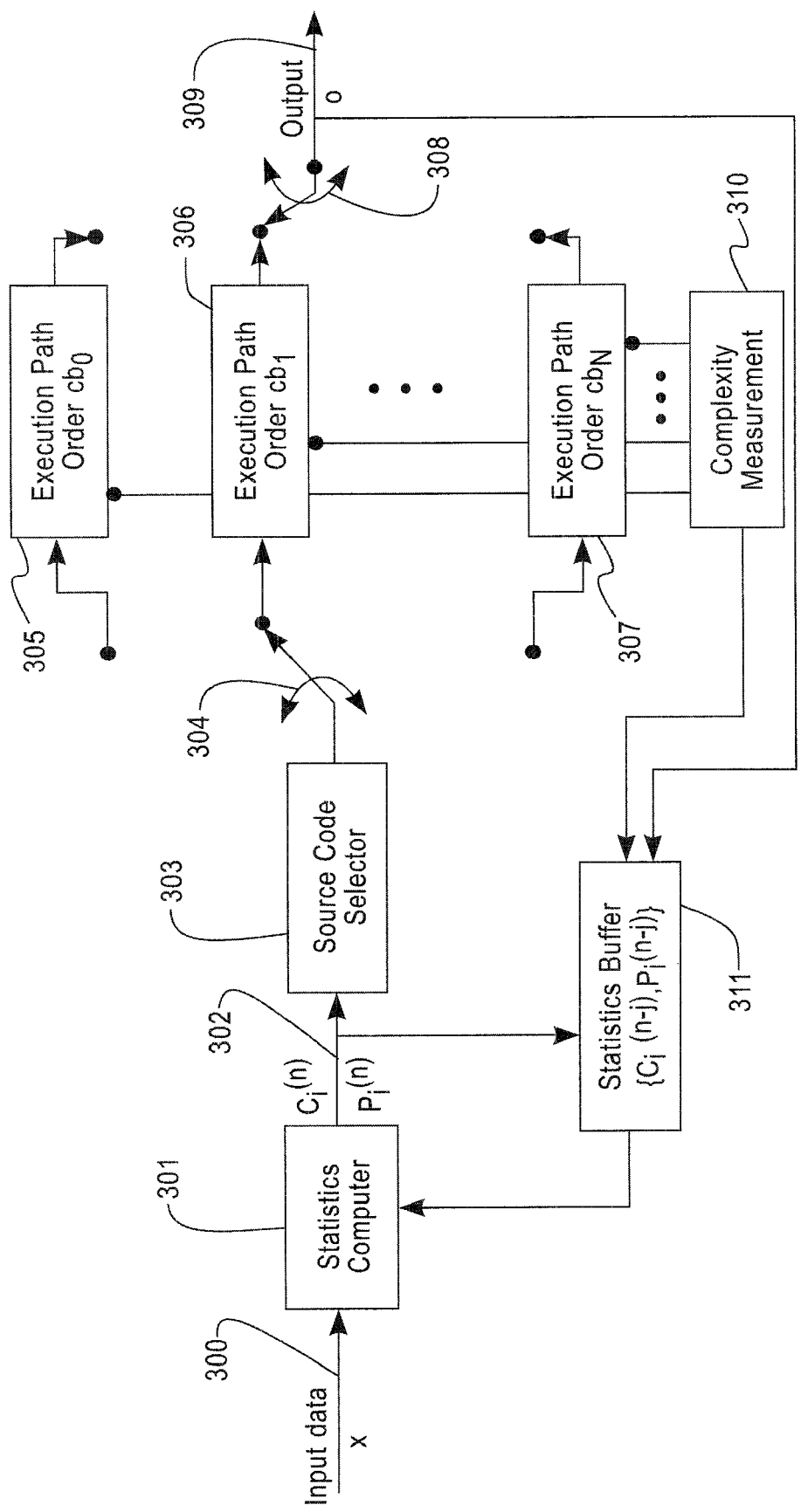
FIG. 3 is a diagram illustrating a method according to an embodiment of the present invention for dynamic, data-dependent optimized program execution.

FIG. 3 depicts an exemplary embodiment of the preferred embodiments of the present invention. Prior to program execution, a plurality of code-trees (equivalently program execution orders) is designed using the aforementioned source-coding method. Each code-tree is optimal for all data which induces statistics {$P_i,C_i$} belonging to a fixed statistical class. The statistical classes for which different code-trees are optimal are mutually exclusive. The exemplary embodiment comprises an input data signal 300, which is input to the statistics computer 301. The statistics computer 301 forms a local time-averaged estimate of the current data statistics $\{P^n{}_i, C^n{}_i\}$ on the basis of the data signal 300, and past statistical information $\{\{P^{n-1}{}_i, C^{n-1}{}_i\}, \ldots, \{P^{n-j}{}_i, C^{n-j}{}_i\}\}$ which it receives from the statistics buffer 311. In an exemplary embodiment, the statistics computer 301 forms a fixed weighted average of the previous j statistics estimates, for example, it implements the following computation $$P_i^n = \sum_j \alpha_j P_i^{n-j} + \pi_i \quad C_i^n = \sum_j \beta_j C_i^{n-j} + \varphi_i$$

where $\pi_i$ and $\varphi_i$ are fixed probability distributions for fixed weights $\alpha_j, \beta_j$. In another exemplary embodiment, the statistics computer 301 makes use of the input data signal 300, to form a weighted average of the statistics observed in the past when the input was identical to the current input x. For example, it implements the following computation $$P_i^n = \sum_{j \in J} \alpha_j P_i^{n-j} + \pi_i \quad C_i^n = \sum_{j \in J} \beta_j C_i^{n-j} + \varphi_i$$

for fixed weights $\alpha_j, \beta_j$ where J is the set of past time instants at which the input was equal to the current data input. In an additional exemplary embodiment the weights, $\alpha_j, \beta_j$ are not fixed, but are modified over time as a function of the difference between the estimated and the observed statistics, for example, as $$\alpha_j = \alpha_{j-1} + \mu \|P^{j-1} - P^{j-2}\| \quad \beta_j = \beta_{j-1} + \lambda \|C^{j-1} - C^{j-2}\|$$

for fixed $\mu$, $\lambda$. In an additional exemplary embodiment, the weights $\alpha_j, \beta_j$ are modified as a function of the difference between the estimated and the observed statistics, and the input data signal 300.

The computed time-averaged statistics $\{P^n{}_i, C^n{}_i\}$ 302 are input to the source code selector 303 which determines the optimal source code-tree for data with the input statistics 302. The output 304 of the source code selector 303 is the execution path order index, which is used to select one out of the plurality of program execution orders, which were designed prior to program execution. For example, if the output 304 of the selector 303 is 0, execution path 305 is selected, if the output 304 of the selector 303 is 1, execution path 306 is selected, and if the output 304 of the selector 303 is N, execution path 307 is selected. In an exemplary embodiment the source code selector 303 uses a look-up table indexed by the statistics 302, to determine the index of the execution path, which is optimal for the statistics 302, where the path corresponds to the optimal Huffman code for the statistics 302. In an alternate embodiment, the source code selector 303 computes the index of the optimal execution path by using a look-up table indexed by the statistics 302 and by past execution path indices, where the optimal path corresponds to the optimal adaptive Huffman code for the statistics 302 and the past execution indices.

The input data is processed by program execution using the selected execution path, and the result of this is the generated output signal 309. The complexity measurement means 310 measures the amount of time and/or the number of cycles required for the execution of the program. The output 309 and the complexity measured by the means 310 are both input to the statistics buffer 311, along with the statistics 302 computed by the statistics computer 301. The statistics buffer 311 stores the complexity value and the value of the output signal, and also uses the output value to update the output probability statistic $\{P^n{}_i\}$. In an exemplary embodiment with $\phi$ possible output values, and with output signal 309 having value equal to o the statistics buffer 311 implements the following computation to update the output probability statistic $$P_o^n = P_o^n + \delta$$
$$P_i^n = P_i^n - \frac{\delta}{\varphi - 1}, i \neq o$$

where $o < \delta < 1$.

The use of multiple alternative program execution orders each of which is optimal for a class of input data statistics allows for optimized program complexity over a large range of input data signals. The use of local time-averaged statistics to select the appropriate program execution order allows for dynamic adaptation, that is, it allows for optimized performance even when data statistics change with time.

Figure 4A:
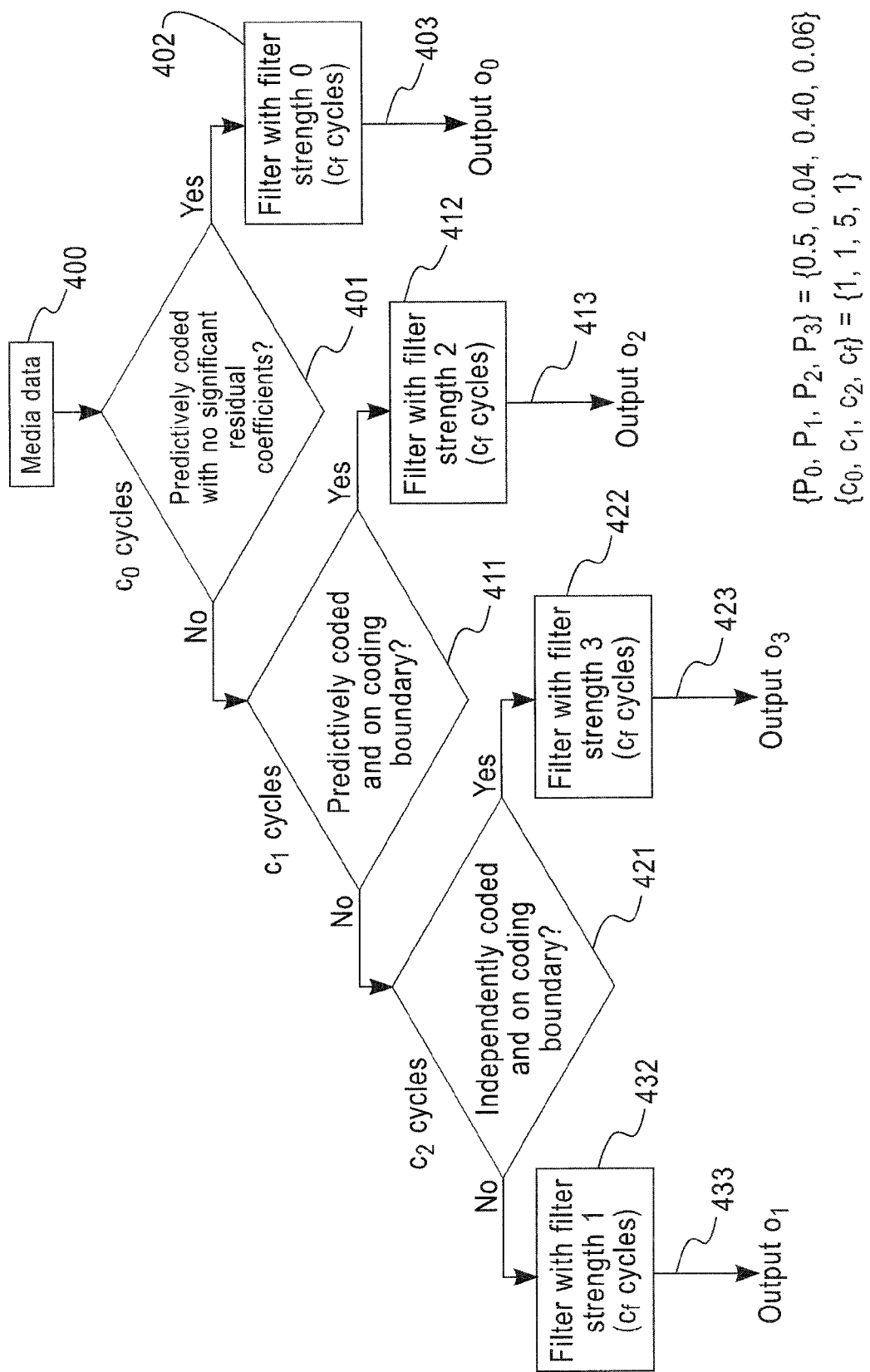
FIGS. 4a and 4b are diagrams illustrating a method according to an embodiment of the present invention for dynamic, data-dependent optimization of a program, which filters a digital media signal.
Figure 4B:
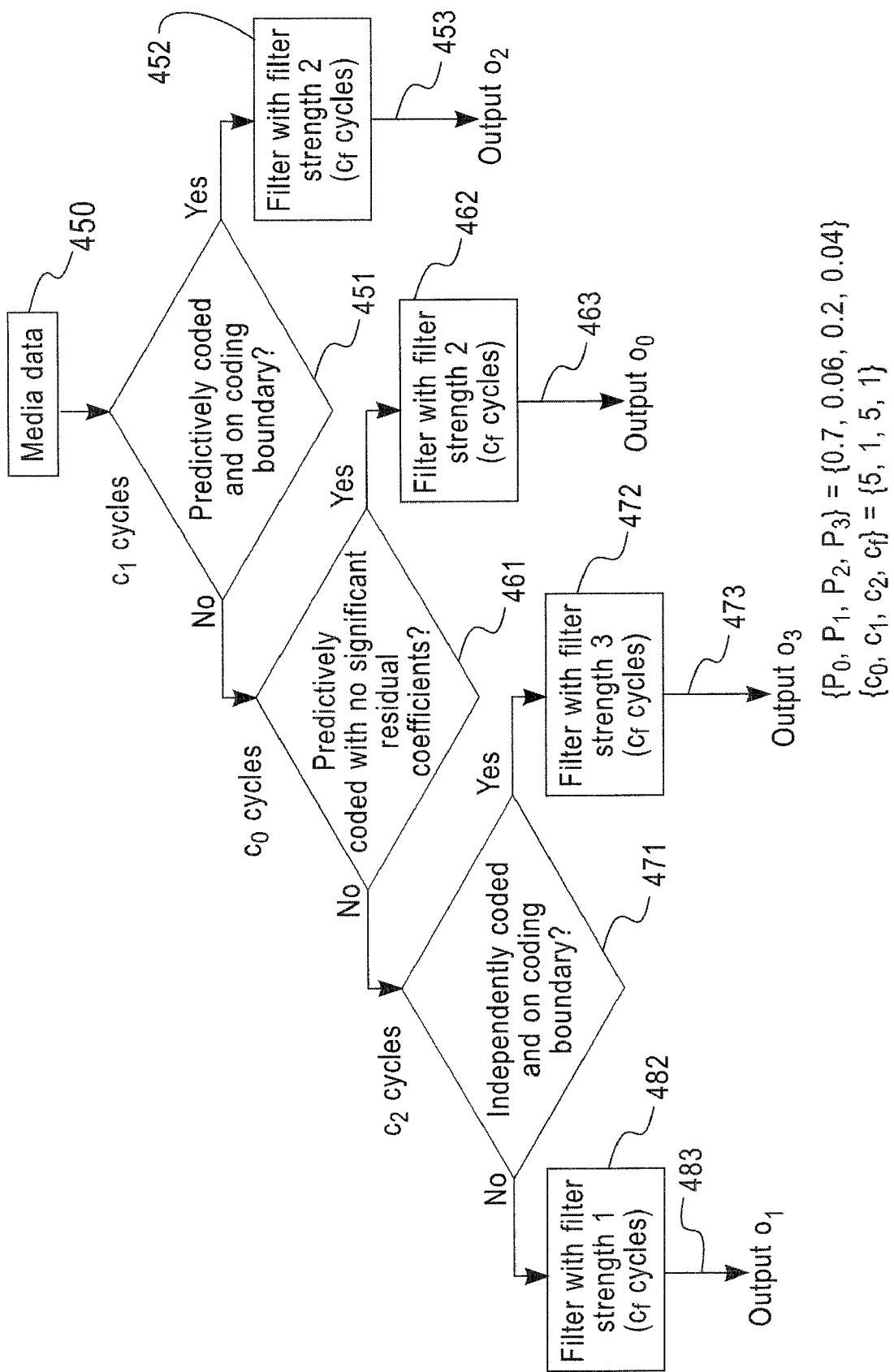
Figure 5:
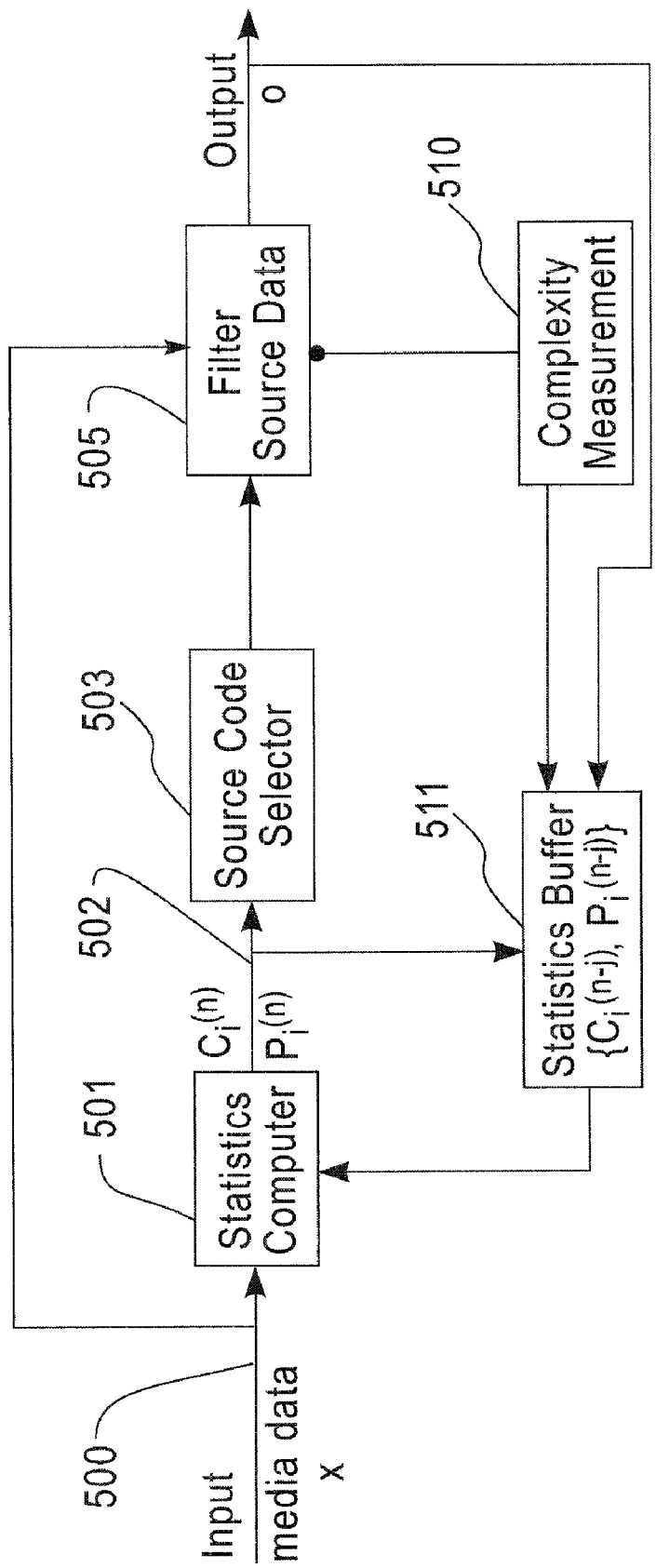
FIG. 5 is a diagram illustrating two alternate program execution orders computed for two different statistical distributions for the exemplary application of filtering of a digital media signal.

An exemplary embodiment of the present invention, which relates to a system for optimized execution of media filtering for digital media sequences, is described in reference to FIG. 4a, FIG. 4b and FIG. 5. A media-filtering program applies one out of a plurality of different filters to the media signal for the purpose of signal enhancement, wherein the selection of the appropriate filter is made on the basis of properties of the input media signal. Media filtering programs typically contain several data-dependent branch instructions, with different paths requiring different amounts of computational cycles to execute. Depending on the statistics $\{P_i, C_i\}$ induced by the input media signal, an optimized execution path order can be determined by using source-coding principles. FIG. 4a and FIG. 4b consider an exemplary media-filtering program for smoothening coded data, which selects between one of four possible filters on the basis of the following three properties of the input media signal:

P1: Is the media signal predictively coded with no significant residual coefficients?
P2: Is the media signal predictively coded and on the boundary of a coded data block?
P3: Is the media signal independently coded and on the boundary of a coded data block?

Evaluating property P1 requires $c_0$ cycles, evaluating property P2 requires $c_1$ cycles, and evaluating property P3 requires $c_3$ cycles. Filtering with any of the four possible filters requires $c_f$ cycles. FIG. 4a and FIG. 4b depict two alternative execution code-trees/path orders, designed using the Huffman coding algorithm, each of which is optimal for a specific output probability distribution and complexity statistic $\{P_i, c_i\}$ (shown next to the path order). The first path order is optimal for the case where the output probability distribution is $\{0.5, 0.04, 0.40, 0.06\}$ and the computational complexities are as follows: $c_0=1$, $c_1=1$, $c_2=5$, and $c_f=1$. In this case, the input media signal 400 is input to the branch instruction 401 which checks if property P1 is satisfied. If it is, the data is filtered with a filter 402 of strength 0, and the output signal 403 is the result of this filtering. If property P1 is not satisfied, the media signal is input to branch instruction 411, which checks if property P2 is satisfied. If it is, the data is filtered with a filter 412 of strength 2, and the output signal 413 is the result of this filtering. If property P2 is not satisfied, the media signal is input to branch instruction 421, which checks if property P3 is satisfied. If it is, the data is filtered with a filter 432 of strength 1, else the data is filtered with a filter 423 of strength 3. Similarly, the second path order is optimal for the case where the output probability distribution is {0.7, 0.06, 0.2, 0.04} and the computational complexities are as follows: $c_0=5$, $c_1=1$, $c_2=5$, and $c_f=1$.

Specifically, with the arrangement shown in FIG. 4(b), the input media signal 450 is input to the branch instruction 451 which checks if property P2 is satisfied. If it is, the data is filtered with a filter 452 of strength 2, and the output signal 453 is the result of this filtering. If property P2 is not satisfied, the media signal is input to branch instruction 461, which checks if property P1 is satisfied. If it is, the data is filtered with a filter 462 of strength 0, and the output signal 463 is the result of this filtering. If property P1 is not satisfied, the media signal is input to branch instruction 471, which checks if property P3 is satisfied. If it is, the data is filtered with a filter 472 of strength 3, else the data is filtered with a filter 482 of strength 1. This second path order is, as mentioned above, optimal for the case where the output probability distribution is {0.7, 0.06, 0.2, 0.04} and the computational complexities are as follows: $c_0=5$, $c_1=1$, $c_2=5$, and $c_f 1$.

FIG. 5 depicts an exemplary embodiment of the present invention, which relates to a system for optimized execution of media filtering for digital media sequences. Prior to media filtering, a plurality of alternative program execution paths, such as those shown in FIGS. 4(a) and 4(b), are designed using source-coding principles. The exemplary embodiment comprises an input digital media signal 500, which is input to the statistics computer 501. The statistics computer 501 forms a local time-averaged estimate of the current statistics $\{P^n_i, C^n_i\}$ on the basis of the media signal 500, and past statistical information $\{\{P^{n-1}_i, C^{n-1}_i\}, \ldots, \{P^{n-j}_i, C^{n-j}_i\}\}$ which it receives from the statistics buffer 511. In an exemplary embodiment, the statistics computer 501 forms a fixed weighted average of the previous j statistics estimates, for example, it implements the following computation $$P^n_i = \sum_j \alpha_j P^{n-j}_i + \pi_i \quad C^n_i = \sum_j \beta_j C^{n-j}_i + \varphi_i$$

for fixed weights $\alpha_j, \beta_j$. In another exemplary embodiment, the statistics computer 501 makes use of the input media signal 500, to form a weighted average of the statistics observed in the past when the input was identical to the current data value x. For example, it implements the following computation $$P^n_i = \sum_{j \in J} \alpha_j P^{n-j}_i + \pi_i \quad C^n_i = \sum_{j \in J} \beta_j C^{n-j}_i + \varphi_i$$

for fixed weights $\alpha_j, \beta_j$ where J is the set of past time instants at which the input was equal to the current data input. In an additional exemplary embodiment, the weights $\alpha_j, \beta_j$ are not fixed, but are modified over time as a function of the difference between the estimated and the observed statistics, for example, as $$\alpha_j = \alpha_{j-1} + \mu \|P^{j-1} - P^{j-2}\| \quad \beta_j = \beta_{j-1} + \lambda \|C^{j-1} - C^{j-2}\|$$

for fixed $\mu, \lambda$. In an additional exemplary embodiment, the weights $\alpha_j, \beta_j$ are modified as a function of the difference between the estimated and the observed statistics, and the input media signal 500.

The computed time-averaged statistics $\{P^n_i, C^n_i\}$ 502 are input to the source code selector 503 which determines the optimal source code-tree for data with the input statistics 502. The output of the source code selector 503 is the execution path order index, which is used to select one out of the plurality of program execution orders (such as those in FIGS. 4(a) and 4(b)), which were designed prior to program execution. In an exemplary embodiment, the source code selector 503 uses a look-up table indexed by the statistics 502, to determine the index of the execution path, which is optimal for these statistics 502, where the path corresponds to the optimal Huffman code for the statistics 502. In an alternate embodiment, the source code selector 503 computes the index of the optimal execution path by using a look-up table indexed by the statistics 502 and by past execution path indices, where the optimal path corresponds to the optimal adaptive Huffman code for the statistics 502 and the past execution indices.

The filtering means 505 uses the selected execution path order to filter the media signal 500, and the result is the output filtered media signal 509. The complexity measurement means 510 measures the amount of time and/or the number of cycles required for the execution of the program. The output signal 509 and the complexity measured by the means 510 are both input to the statistics buffer 511, along with the statistics 502 computed by the statistics computer 501. The statistics buffer 511 stores the complexity value and the value of the output signal, and also uses the output value to update the output probability statistic $\{P^n_i\}$. In an exemplary embodiment with $\phi$ possible output values, and with output signal 509 having value equal to o, the statistics buffer 511 implements the following computation to update the output probability statistic $$P^n_o = P^n_o + \delta$$

$$P^n_i = P^n_i - \frac{\delta}{\varphi - 1}, i \neq o$$

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

The method of the present invention will be generally implemented by a computer executing a sequence of program instructions for carrying out the steps of the method and may be embodied in a computer program product comprising media storing the program instructions. For example, FIG. 6 and the following discussion provide a brief general description of a suitable computing environment in which the invention may be implemented. It should be understood, however, that handheld, portable, and other computing devices of all kinds are contemplated for use in connection with the present invention. While a general-purpose computer is described below, this is but one example, the present invention may be implemented in an environment of networked hosted services in which very little or minimal client resources are implicated, e.g., a networked environment in which the client device serves merely as a browser or interface to the World Wide Web.

Although not required, the invention can be implemented via an application-programming interface (API), for use by a developer, and/or included within the network browsing software, which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), server computers, hand-held or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

Figure 6:
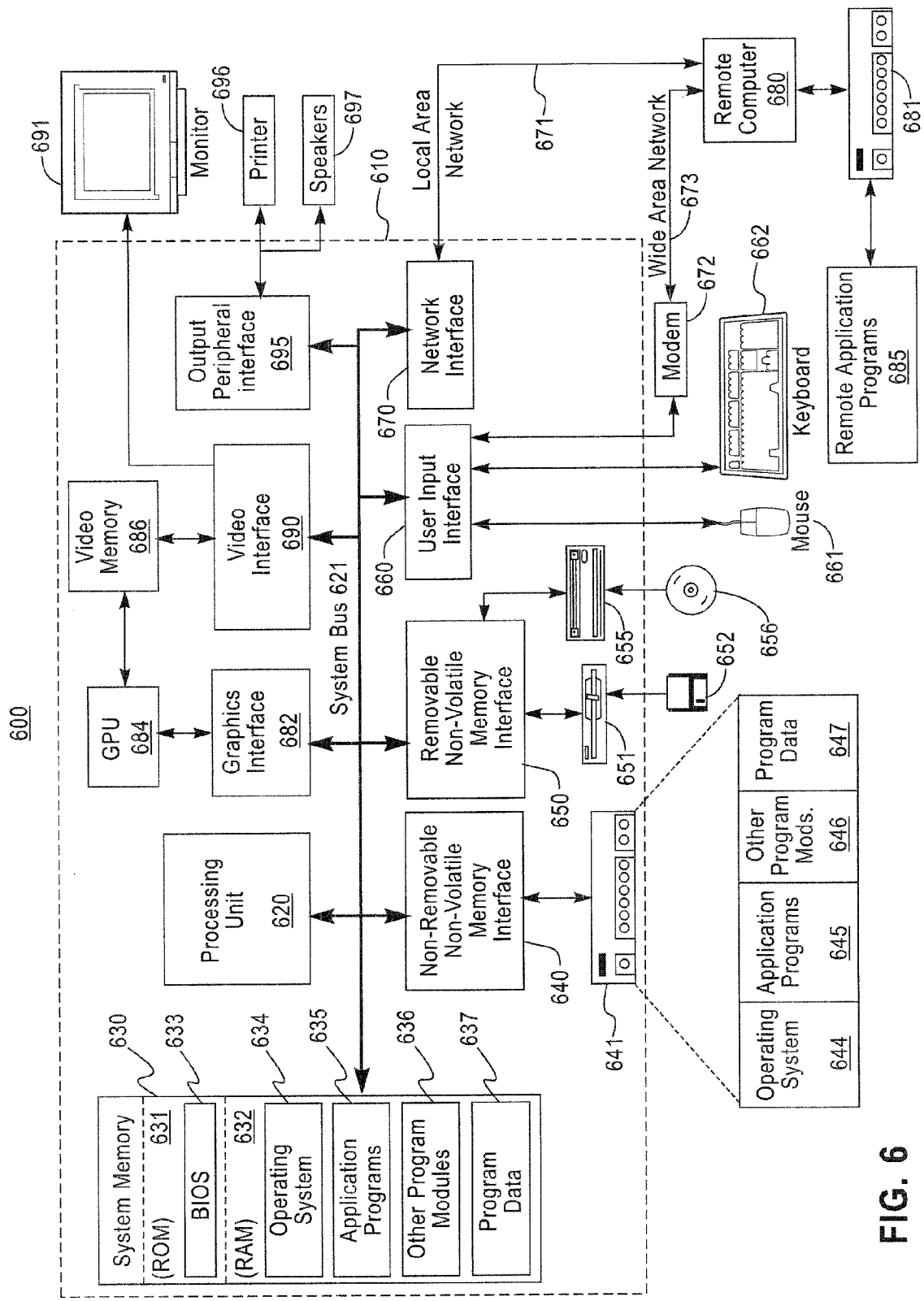
FIG. 6 is a block diagram of an exemplary computing environment in which the invention may be implemented.

FIG. 6, thus, illustrates an example of a suitable computing system environment 600 in which the invention may be implemented, although as made clear above, the computing system environment 600 is only one example of a suitable computing environment and is not intended to suggest any limitation as to the scope of use or functionality of the invention. Neither should the computing environment 600 be interpreted as having any dependency or requirement relating to any one or combination of components illustrated in the exemplary operating environment 600.

With reference to FIG. 6, an exemplary system for implementing the invention includes a general purpose-computing device in the form of a computer 610. Components of computer 610 may include, but are not limited to, a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 610 typically includes a variety of computer readable media. Computer readable media can be any available media that can be accessed by computer 610 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 610. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer 610, such as during start-up, is typically stored in ROM 631. RAM 632 typically contains data and/or program modules that are immediately accessible to and/or presently being operated on by processing unit 620. By way of example, and not limitation, FIGS. 4-6 illustrate operating system 634, application programs 635, other program modules 636, and program data 637.

The computer 610 may also include other removable/non-removable, volatile/nonvolatile computer storage media. By way of example only, FIGS. 4-6 illustrate a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives and their associated computer storage media discussed above and illustrated in FIGS. 4-6 provide storage of computer readable instructions, data structures, program modules and other data for the computer 610. In FIG. 6, for example, hard disk drive 641 is illustrated as storing operating system 644, application programs 645, other program modules 646, and program data 647. Note that these components can either be the same as or different from operating system 634, application programs 635, other program modules 636, and program data 637. Operating system 644, application programs 645, other program modules 646, and program data 647 are given different numbers here to illustrate that, at a minimum, they are different copies. A user may enter commands and information into the computer 610 through input devices such as a keyboard 662 and pointing device 661, commonly referred to as a mouse, trackball or touch pad. Other input devices (not shown) may include a microphone, joystick, game pad, satellite dish, scanner, or the like. These and other input devices are often connected to the processing unit 620 through a user input interface 660 that is coupled to the system bus 621, but may be connected by other interface and bus structures, such as a parallel port, game port or a universal serial bus (USB).

A monitor 691 or other type of display device is also connected to the system bus 621 via an interface, such as a video interface 690. A graphics interface 682, such as Northbridge, may also be connected to the system bus 621. Northbridge is a chipset that communicates with the CPU, or host-processing unit 620, and assumes responsibility for accelerated graphics port (AGP) communications. One or more graphics processing units (GPUs) 684 may communicate with graphics interface 682. In this regard, GPUs 684 generally include on-chip memory storage, such as register storage and GPUs 684 communicate with a video memory 186. GPUs 684, however, are but one example of a coprocessor and thus a variety of co-processing devices may be included in computer 610. A monitor 691 or other type of display device is also connected to the system bus 621 via an interface, such as a video interface 690, which may in turn communicate with video memory 686. In addition to monitor 691, computers may also include other peripheral output devices such as speakers 697 and printer 696, which may be connected through an output peripheral interface 695.

The computer 610 may operate in a networked environment using logical connections to one or more remote computers, such as a remote computer 680. The remote computer 680 may be a personal computer, a server, a router, a network PC, a peer device or other common network node, and typically includes many or all of the elements described above relative to the computer 610, although only a memory storage device 681 has been illustrated in FIG. 6. The logical connections depicted in FIG. 6 include a local area network (LAN) 671 and a wide area network (WAN) 673, but may also include other networks. Such networking environments are commonplace in offices, enterprise-wide computer networks, intranets and the Internet.

When used in a LAN networking environment, the computer 610 is connected to the LAN 671 through a network interface or adapter 670. When used in a WAN networking environment, the computer 610 typically includes a modem 672 or other means for establishing communications over the WAN 673, such as the Internet. The modem 672, which may be internal or external, may be connected to the system bus 621 via the user input interface 660, or other appropriate mechanism. In a networked environment, program modules depicted relative to the computer 610, or portions thereof, may be stored in the remote memory storage device. By way of example, and not limitation, FIG. 6 illustrates remote application programs 685 as residing on memory device 681. It will be appreciated that the network connections shown are exemplary and other means of establishing a communications link between the computers may be used.

One of ordinary skill in the art can appreciate that a computer 610 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

As will be readily apparent to those skilled in the art, the present invention can be realized in hardware, software, or a combination of hardware and software. Any kind of computer/server system(s)—or other apparatus adapted for carrying out the methods described herein—is suited. A typical combination of hardware and software could be a general-purpose computer system with a computer program that, when loaded and executed, carries out the respective methods described herein. Alternatively, a specific use computer, containing specialized hardware for carrying out one or more of the functional tasks of the invention, could be utilized.

The present invention, or aspects of the invention, can also be embodied in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

Having described embodiments for a mechanism and method for optimized, dynamic data-dependent program execution, it is noted that modifications and variations can be made by persons skilled in the art in light of the above teachings. It is therefore to be understood that changes may be made in the particular embodiments of the invention disclosed which are within the scope and spirit of the present invention.

What is claimed is:

1. A method of run-time statistics dependent program execution to process a given input data signal, the method comprising the steps of:
   prior to run-time, designing a plurality of program execution path orders, each of the execution path orders including a plurality of processing paths;
   at run time, determining a defined set of statistics of said input data signal, said defined set of statistics including, for each of the processing paths of the execution path orders, a respective one complexity value and a respective one probability value, the complexity value of each processing path being a defined measure of the complexity of using said each processing path to process the input data signal, and the probability value of each processing path being a defined measure of the probability that the input data signal will be processed by said each processing path;
   at run-time, determining a combined value for each of the execution path orders based on a defined combination of the probability values and the complexity values for the processing paths of said each execution path order;
   using said defined set of statistics, including using said combined values for the execution path orders in a defined procedure, to select one of said plurality of program execution path orders to process said given input data signal; and
   processing said input data signal according to said selected program execution path order.

2. The method according to claim 1, wherein said execution path orders include a multitude of program modules, and said statistics include the probability distribution of the incoming data, the probability distribution over program modules induced by the incoming data, the probability distribution induced over program outputs by the incoming data, and the time-complexity of each program module for the incoming data, and wherein the said statistics are computed as a function of current and past data and previously computed statistics.

3. The method according to claim 1, wherein each of the execution path orders is computed prior to run-time as a function of an adaptive Huffman code which is designed using the said statistics.

4. The method according to claim 1, wherein each of the execution path orders includes a plurality of paths and the defined set of statistics include:
   for each path of each execution path order, a respective one probability value $P_i$ representing the probability that said each path will be taken, and a respective one complexity value $C_i$ representing the complexity of the said each path.

5. The method according to claim 4, wherein the selected execution path order is the execution path order having the minimal $P_i C_i$ over all of the paths of the execution path order.

6. The method according to claim 1, wherein the step of processing said input data includes the step of measuring the time-complexity of processing said input data according to said optimal program execution path order.

7. The method according to claim 2, wherein said statistics are a local time-averaged estimate of the probability distribution induced over program outputs by the incoming data and the time complexity of each program module for the incoming data, as a fixed weighted average of a plurality of previous statistics estimates.

8. The system for run-time statistics dependent program execution to process a given input data signal on one of a plurality of execution path orders, each of the execution path orders including a plurality of processing paths the system comprising:
   a statistics computer for determining, at run time, a defined set of statistics of said input data signal, said defined set of statistics including for each of the processing paths of the execution path orders, a respective one complexity value and a respective one probability value, the complexity value of each processing path being a defined measure of the complexity of using said each processing path to process the input data signal, and the probability value of each processing path being a defined measure of the probability that the input data signal will be processed by said each processing path; and
   a selector for, at run-time, determining a combined value for each of the execution path orders based on a defined combination of the probability values and the complexity values for the processing path of said each execution path order; and for selecting, one of said execution path orders for said input data signal as a function of said set of statistics, including using said combined values for the execution path orders in a defined procedure, and for directing the input data signal onto said selected execution path order for processing according to said selected execution path order.

9. The system according to claim 8, wherein said execution path orders include a multitude of program modules, and said statistics include the probability distribution of the incoming data, the probability distribution over program modules induced by the incoming data, the probability distribution induced over program outputs by the incoming data, and the time-complexity of each program module for the incoming data, and wherein the said statistics are computed as a function of current and past data and previously computed statistics.

10. The system according to claim 8, further comprising a complexity measurement means for measuring the time-complexity of processing said input data according to said selected program execution path order.

11. The system according to claim 8, wherein each of the said multiple alternative execution path orders is computed prior to run-time as the function of an adaptive Huffman code is designed using the said statistics.

12. The system according to claim 8, wherein the statistics computer forms a local time-averaged estimate of the probability distribution induced over program outputs by the incoming data and the time-complexity of each program module for the incoming data, as a fixed weighted average of a plurality of previous statistics estimates.

13. The system according to claim 8, wherein the statistics computer forms a local time-averaged estimate of the probability distribution induced over program outputs by the incoming data and the time-complexity of each program module for the incoming data, as a fixed weighted average of a plurality of the previous statistics estimates formed at time instants at which the input was equal to the current data input.

14. The system according to claim 8, wherein the statistics computer forms a local time-averaged estimate of the probability distribution induced over program outputs by the incoming data and the time-complexity of each program module for the incoming data, as a weighted average of a plurality of previous statistics estimates, wherein the weights are modified over time as a function of the discrepancy between the estimated and the observed statistics.

15. The program storage device readable by machine, tangibly embodying a program of instructions executable by the machine to perform method steps for run-time statistics dependent program execution to process a given input data signal according to one of a plurality of program execution path orders designed prior to run-time, each of the execution path orders including a plurality of processing paths, the method steps comprising:
   at run time, determining a defined set of statistics of said input data signal, said defined set of statistics including, for each of the processing paths of the execution path orders, a respective one complexity value and a respective one probability value, the complexity value of each processing path being a defined measure of the complexity of using said each processing path to process the input data signal, and the probability value of each processing path being a defined measure of the probability that the input data signal will be processed by said each processing path;
   at run-time, determining a combined value for each of the execution path orders based on a defined combination of the probability values and the complexity values for the processing paths of said each execution path order;
   using said defined set of statistics, including using said combined values for the execution path orders in a defined procedure, to select one of said plurality of program execution path orders to process said given input data signal; and
   processing said input data signal according to said selected program execution path order.

16. The program storage device according to claim 15, wherein said execution path orders include a multitude of program modules, and said statistics include the probability distribution of the incoming data, the probability distribution over program modules induced by the incoming data, the probability distribution induced over program outputs by the incoming data, and the time-complexity of each program module for the incoming data, and wherein the said statistics are computed as a function of current and past data and previously computed statistics.

17. The program storage device according to claim 15, wherein each of the execution path orders is computed prior to run-time as a function of an adaptive Huffman code which is designed using the said statistics.

18. The method of deploying a computer program product for run-time statistics dependent program execution to process a given input data signal according to one of a plurality of program execution path orders designed prior to run-time, each of the execution path orders including a plurality of processing paths, wherein, when executed, the computer program performs the steps of:

at run time, determining a defined set of statistics of said input data signal, said defined set of statistics including for each of the processing paths of the execution path orders, a respective one complexity value and a respective one probability value, the complexity value of each processing path being a defined measure of the complexity of using said each processing path to process the input data signal, and the probability value of each processing path being a defined measure of the probability that the input data signal will be processed by said each processing path;

at run-time, determining a combined value for each of the execution path orders based on a defined combination of the probability values and the complexity values for the processing paths of said each execution path order; using said defined set of statistics, including using said combined values for the execution path orders in a defined procedure, to select one of said plurality of program execution path orders to process said given input data signal; and processing said input data signal according to said selected program execution path order.

19. The method according to claim 18, wherein said execution path orders include a multitude of program modules, and said statistics include the probability distribution of the incoming data, the probability distribution over program modules induced by the incoming data, the probability distribution induced over program outputs by the incoming data, and the time-complexity of each program module for the incoming data, and wherein the said statistics are computed as a function of current and past data and previously computed statistics.

20. The method according to claim 18, wherein each of the execution path orders is computed prior to run-time as a function of an adaptive Huffman code which is designed using the said statistics.

\* \* \* \* \*